Aug. 11, 1964        K. DELLER        3,143,977

BOGIES FOR MONORAIL VEHICLES

Filed March 15, 1961        4 Sheets-Sheet 1

INVENTOR.
Konrad Deller

BY

ATTORNEYS

Aug. 11, 1964     K. DELLER     3,143,977
BOGIES FOR MONORAIL VEHICLES
Filed March 15, 1961     4 Sheets-Sheet 4

INVENTOR.
Konrad Deller
BY
*Strauch, Nolan & Neale*
ATTORNEYS

— # United States Patent Office 3,143,977
Patented Aug. 11, 1964

3,143,977
BOGIES FOR MONORAIL VEHICLES
Konrad Deller, Cologne-Deutz, Germany, assignor to Alweg-Forschung, G.m.b.H., Cologne, Germany, a corporation of Germany
Filed Mar. 15, 1961, Ser. No. 95,914
Claims priority, application Germany Mar. 23, 1960
8 Claims. (Cl. 105—144)

This invention relates to bogies for monorail vehicles, particularly for those of the monobeam type which are arranged to support the end of one vehicle body or the adjacent ends of two adjacent vehicle bodies.

In the art, bogies for monobeam vehicles are known which resiliently carry vehicle carrying wheels and upper and lower side guide wheels contacting the top and side surfaces of a substantially rectangular beam-like supporting structure, respectively.

In bogies of this type spring movements of the carrying wheels, for example, those caused by unequalities of the running surface, move the side wheels vertically (transversely to their direction of running). This causes a strong abrasion of the pneumatic tires. Also the vehicle spring suspension of the carrying wheels is disturbed by frictional forces resulting from the vertical movement of the side wheels. Another disadvantage of bogies of this type is that the spring suspension for the vertical movement, which in order to obtain good running qualities should be soft, is not separated from the lateral suspension which protects against tilting movements, which for obtaining a smooth running performance should be hard and strongly progressive.

When the vertical spring suspension is soft, great tilting amplitudes must be put up with, or, vice versa, when a lateral spring suspension which avoids great tilting movements is provided, the vertical spring suspension becomes hard.

It is therefore a primary object of the present invention to provide an improved bogie construction wherein vertical suspension of the vehicle body is maintained soft enough to provide good riding qualities while excessive tilting of the vehicle body about a longitudinal axis relative to the bogie is prevented.

It is a further major object of the instant invention to provide an improved monobeam vehicle bogie having vertical and lateral acting resilient supporting means with parallel guide means operatively connected between said bogie and the vehicle body whereby said vertical and lateral acting resilient supporting means are permitted to act independently of each other.

In attaining this object and other objects, the invention provides a novel bogie construction in which between the bogies and one of the supported vehicle bodies a spring suspension is arranged which acts substantially in the vertical direction and in which between the bogie and vehicle body a parallel guide device twisting moment force transferring means is arranged which permits a slight turning movement of the vehicle body about a vertical axis and a vertical movement of the vehicle body with respect to the bogie but prevents excessive tilting of the vehicle body about a longitudinal axis with respect to the bogie.

The bogie of the present invention is particularly adapted for supporting the adjacent ends of two adjacent vehicle bodies. The adjacent ends of the vehicle bodies are resiliently independently pivotally supported upon the bogie and a parallel guide device is operatively connected between the adjacent ends of each vehicle body and the bogie. The parallel guide devices permit a slight turning movement of the vehicle bodies about the respective pivots of the bogie and vertical movements of the vehicle bodies with respect to the bogie but prevent excessive tilting of the vehicle bodies about a longitudinal axis with respect to the bogies.

In bogies constructed in accordance with the instant invention a special spring suspension of the carrying axles can be omitted which eliminates, among other things, a heavy pitching movement of the bogie such as caused with conventional bogies due to their small axle base by driving and braking forces. Also the side wheels contacting the side surfaces of the supporting structure maintain their level position as well as their parallel position with respect to their running direction so that the abrasion is also small for pneumaitc tires.

In a vehicle body supported on the bogie of the instant invention vertical movements of the vehicle body with respect to the running surface are taken up exclusively by the vertically acting resilient spring means arranged between the bogie and the vehicle bodies. Tilting movements of the vehicle bodies are transmitted by the parallel guide devices to the bogie and are taken up solely by the laterally acting spring suspension of the upper and lower side wheels contacting the side surfaces of the supporting structure. Thus the springs arranged between the bogie and the vehicle body can be made relatively soft and those of the side wheels relatively hard and strongly progressively acting.

Further, due to the independent resilient suspension provided by the instant invention, it is advantageously possible to develop the springs for the vertical movement of the vehicle bodies, which are independent from each other, as air suspension springs the spring characteristics of which are automatically adjustable with respect to the respective load condition.

A preferred embodiment of the bogie according to the present invention embodies parallel guide devices or parallel guide means, each of which comprises a shaft arranged substantially parallel to the carrying axles of the bogie and pivotally supported from the vehicle body, the shaft having fixedly secured to it two lateral lever pieces aligned in the same direction, and connecting rods arranged between these lever pieces and the bogie and pivoted about an axis substantially parallel to the shafts. Preferably the shafts are arranged about level with the floor of the vehicle as close as possible to the carrying wheels of the bogie and the connecting rods are pivoted to the bogie with their upper ends close to the carrying wheels about level with the axles of the carrying wheels. Thus the bogie has an especially compact shape. The connecting rods and the lever pieces of the shafts are arranged with respect to each other in such a way that they form about a right angle when the vehicle is normally loaded.

When the vehicle bodies are moving on their springs in the vertical direction relatively to the bogie with the turning of the shafts, the angle between the lever pieces and the connecting rods alters so that the parallel guide devices do not influence the vertical spring suspension of the vehicle bodies.

The forces which result from tilting movement of the vehicle body caused, for example, by centrifugal forces or by lateral wind, are transmitted by the shafts, the lever pieces and the connecting rods of each parallel guide device directly to the bogie and the forces transmitted are taken up by the strongly progressive springs of the upper and lower side wheels. In monorail installations of this type, the radii of the curves of the track are relatively great and the vehicle bodies exert only slight turning movements about the pivots of the bogies when passing a curve. Turning movements therefore can easily be taken up by a corresponding design of the links of the parallel guide device, e.g. with ball joints, axial play of the shafts and by the elasticity of the connecting rods. Also the resilient spring means arranged laterally between the bogie and the vehicle bodies can follow those turning movements.

The bogie is composed of box sections and has an upper frame piece forming an H in a plan view, the longitudinal legs of which carry the bearings for two carrying axles. Connected to this upper frame piece are two lateral depending jaws which straddle the supporting structure and carry the resiliently supported upper and lower side wheels. In this rigid framework which in plan view has the shape of an H, in the front view the shape of a U and in the side view the shape of a T, two rigid carrying axles are mounted and eight side wheels pivotally connected by means of rockers. In order to keep the center of gravity as low as possible but on the other hand to use as little as possible of the passenger compartment by the bogies, the vehicle bodies are supported by transverse girders which are offset downwardly at both sides of the upper frame piece of the bogie on springs arranged between both carrying axles at both sides of the bogie beneath the vehicle floor, which are kept in position by laterally projecting brackets of the bogie.

When a train unit comprising two vehicles is supported in accordance with the instant invention, each vehicle is supported at its longitudinal center on a central bogie having no parallel guide devices between the bogie and the vehicle body for preventing tilting movements and at each end on bogies which are provided with parallel guide means.

Additional objects and advantages will become apparent as the description proceeds in connection with the accompanying drawings in which.

Figure 1:
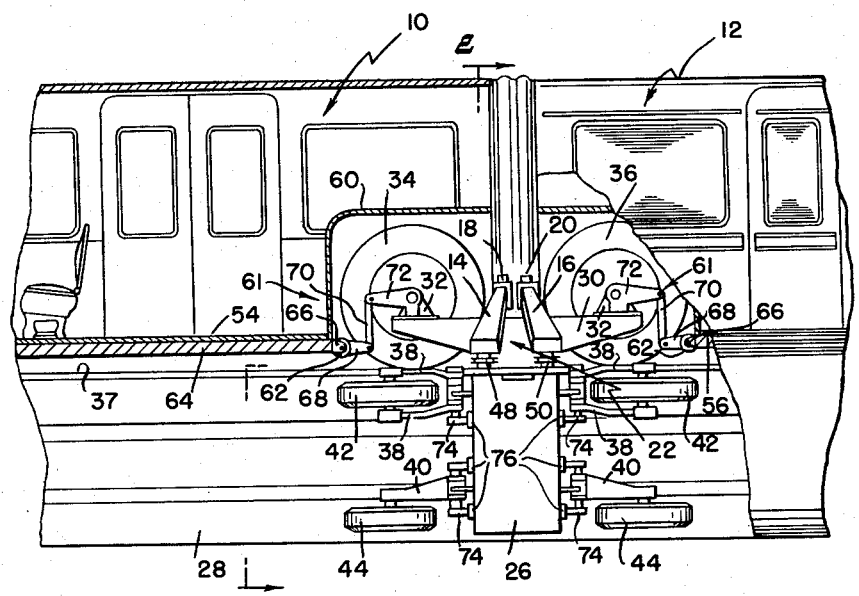
FIGURE 1 is a side view, partly in section, of the bogie of the instant invention supporting the adjacent ends of two adjacent vehicle bodies.
Figure 2:
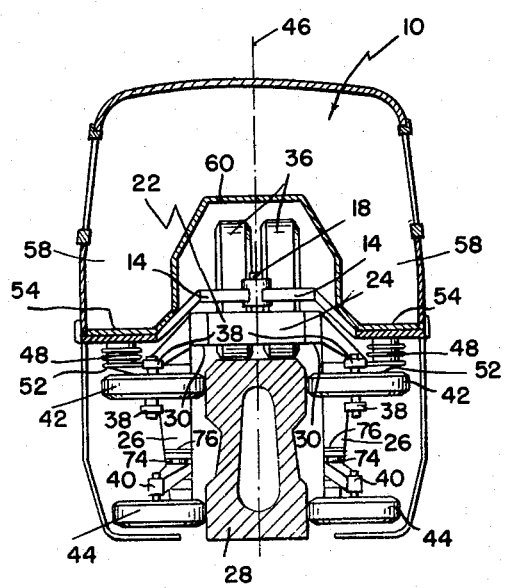
FIGURE 2 is a front view of the bogie taken substantially along line 2—2 of FIGURE 1.

Referring to the drawings and more particularly to FIGURES 1 and 2, the ends of two monobeam vehicles generally designated by numerals 10 and 12 are each supported by transverse girders 14 and 16 on the pivotal connecting means 18 and 20 respectively of a common bogie generally designated by numeral 22.

Figure 3:
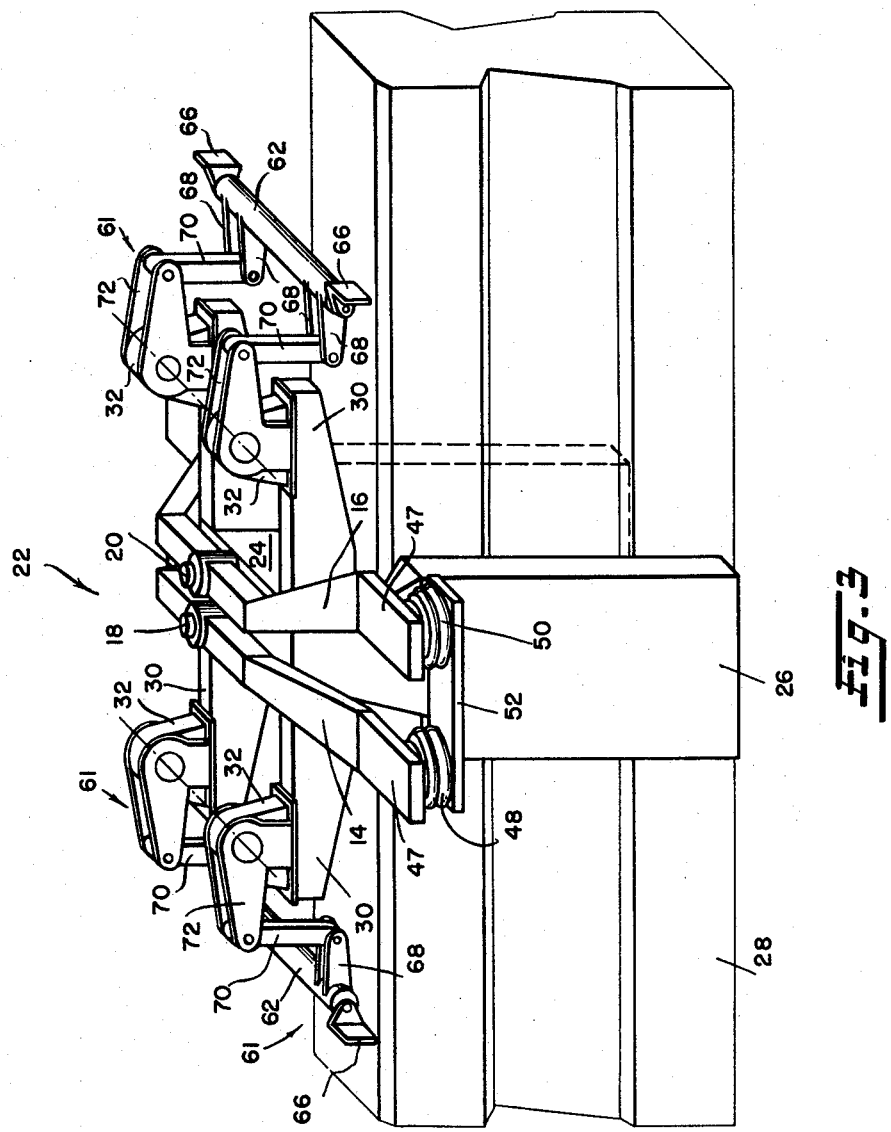
FIGURE 3 is a perspective view of the bogie of the instant invention with the vehicle wheels eliminated.
Figure 4:
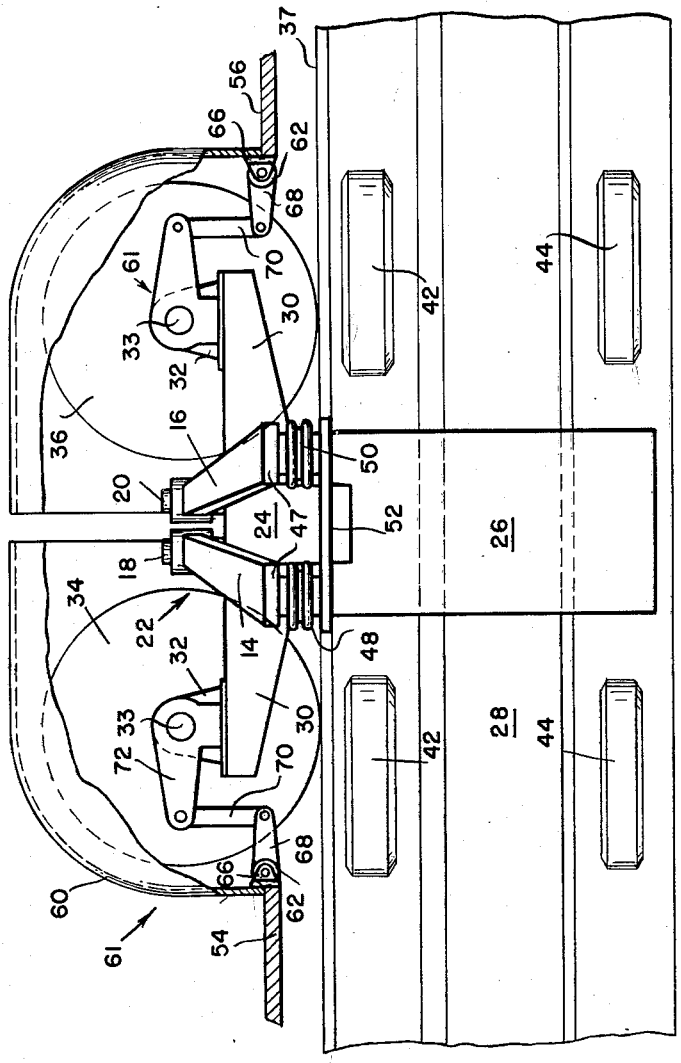
FIGURE 4 is an enlarged partially sectional side view of the bogie of the instant invention supporting the adjacent ends of two adjacent vehicle bodies.

The transverse girders 14 and 16 form part of the frame structure of the corresponding vehicles. As shown more detailed in FIGURES 3 to 5, the bogie 22 comprises a welded framework composed of box sections which in a plan view (FIGURE 5) form substantially an H, in the front view an inverted U (FIGURE 2) and in the side view a T (FIGURE 4). As is shown in FIGURE 2, the laterally depending jaws 26 of this framework straddle the beam shaped supporting structure 28 in a saddle-like manner and are welded at their upper ends to a bogie central piece 24. Longitudinal legs 30 (FIGURES 3 and 5) are also welded to the bogie central piece 24 and form the upper H-shaped frame piece and carry in brackets 32 the axles 33 (FIGURE 4) of the unsprung carrying wheels 34 and 36 which run on the upper surface 37 of the supporting structure 28. Brackets 32 contain wheel bearings for rotatably journalling the axles, the bearings, being conventional, are not shown. Pivotally connected to the jaws 26 are spring suspended upper and lower rocker arms 38 and 40 (FIGURES 1 and 2) which rotatably mount upper and lower side wheels 42 and 44 respectively. The transverse girders 14 and 16 of the vehicles 10 and 12 respectively are supported for vertical sliding movement on pivots 18 and 20 which are positioned in the longitudinal center plane 46 (FIGURE 5) of the vehicles and their laterally off-set ends 47 are supported on the vertically acting air bellows 48 and 50 respectively interposed between the girders 14 and 16 respectively and consoles or bearing pads 52 fixedly secured laterally to the jaws 26, e.g. by welding.

The consoles 52 are arranged about level with the top running surface 37 of the supporting structure 28, as shown in FIGURES 1 and 4, so that, underneath the floor structure 54 and 56 of the vehicles 10 and 12 respectively, there is space enough for the air bellows 48 and 50 respectively.

As best shown in FIGURE 2, the low arrangement of the springs 48 and 50 relative to the floor structures of the vehicle bodies 10 and 12 respectively renders it possible to provide stepless passages 58 next to the wheel box 60 covering the carrying wheels 34 and 36 respectively inside of the passenger compartment.

Between the vehicle bodies 10 and 12 respectively and the common bogie 22, vertical longitudinally parallel guide devices 61 are arranged which are described hereinafter with respect to the vehicle 10 only. It is understood, however, that an identical construction is also provided for the vehicle 12.

Parallel guide device 61 comprises a transverse shaft 62 (FIGURES 3, 4 and 5) which is pivotally secured to the vehicle 10 by brackets 66 and has fixedly secured to it as by welding spaced laterally extending lever pieces 68 to the ends of which connecting rods 70 are pivotally connected. The other ends of connecting rods 70 are pivotally connected about level with the axles 33 of the carrying wheels 34 to cantilever brackets 72 which together with the bearings 32 for the carrying wheels are fixedly secured to the forward ends of the respective longitudinal legs 30 of the bogie frame structure. When the vehicles are normally loaded, the connecting rods 70 are substantially perpendicular to the lever pieces 68.

When the vehicle bodies move relative to the bogie in the vertical direction, as caused, for example, by inequalities in the running surface, each shaft 62 pivots relative to the vehicle body in the spaced brackets 66 and consequently the angle between the lever piece 68 and the connecting rod 70 is altered so that the vertical movement of a vehicle body with respect to the bogie can take place without hindrance. The parallel guide device 61 also allows a slight turning of the vehicle body about its pivot when a curve is passed. However, forces caused by tilting movement of the vehicle body about a longitudinal axis, such as are caused by centrifugal forces in curves or by side wind, are directly transmitted from the vehicle body by the parallel guide devices 62, 68, 70 to the bogie and are taken up by the laterally acting spring suspension of the upper and lower side wheels 42 and 44. This suspension per se forms no part of the present invention and may take any conventional form, i.e., the form shown in U.S. Patent 2,987,013. In the illustrated embodiment, the springs comprise torsion bars 74, anchored by a pad or pads 76 to the jaws 26.

Figure 5:
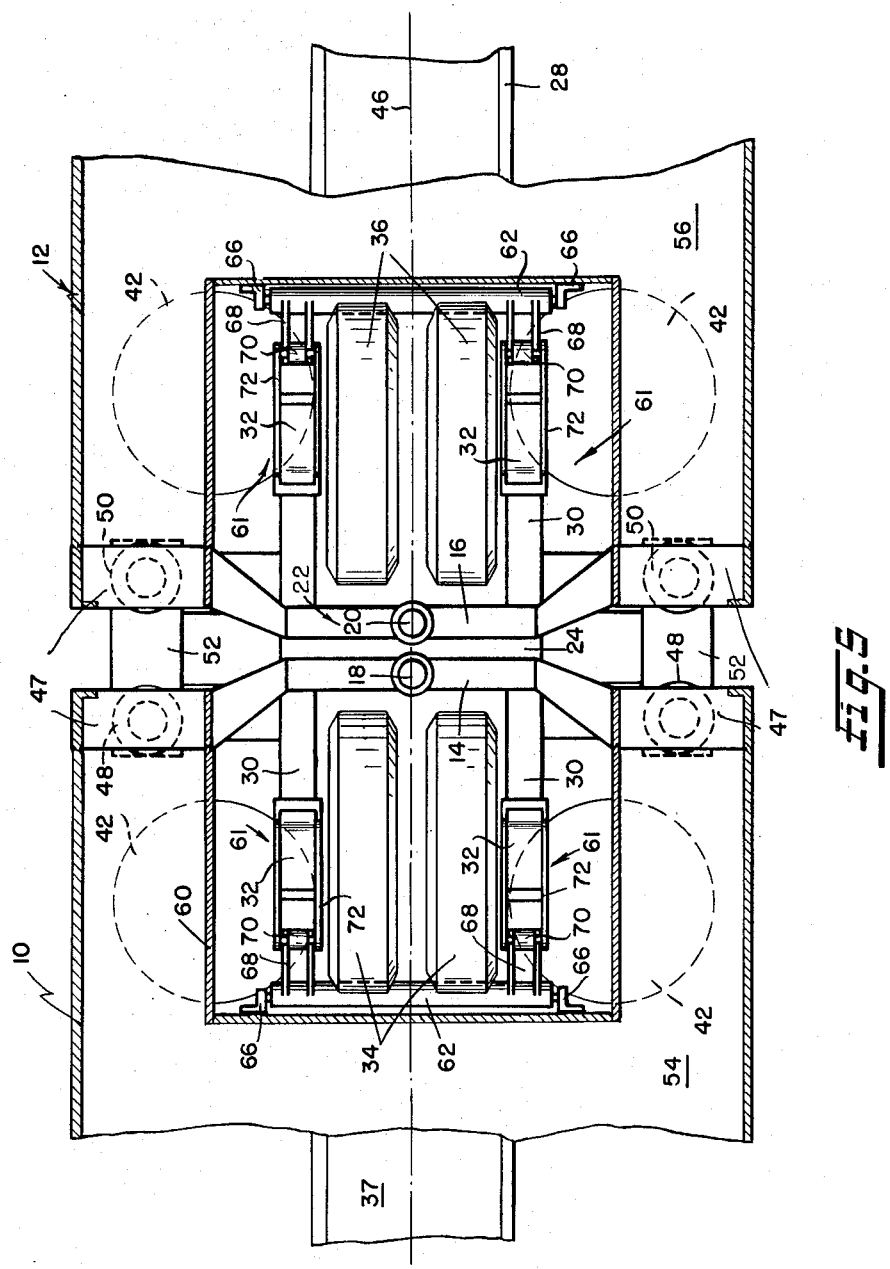
FIGURE 5 is a plan view of the bogie in enlarged scale with the vehicle bodies shown in section.

As best shown in FIGURES 4 and 5, the shaft 62 is arranged as close as possible to the carrying wheels 34 and the lever pieces 68, connecting rods 70 and cantilever brackets 72 are arranged immediately next to the carrying wheel 34. Thus the portion of wheel box 60 which protrudes into the passenger compartment is kept as small as possible so that as little as possible of the useful space of the vehicle is lost. Inside of the wheel box 60 is enough space for the provision of brakes and drive gear (not shown) for the carrying wheels.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination a monobeam straddling bogie, a monorail vehicle body, spring suspension means operatively interposed between said bogie and said body and acting vertically for resiliently supporting said body on said bogie, additional suspension means independent of said spring suspension means interposed between said bogie and said body for preventing tilting movement of the vehicle about its longitudinal axis with respect to said bogie.

2. The combination defined in claim 1, wherein said bogie includes a framework comprised of box sections and having a central frame piece to which oppositely longitudinally extending legs are secured at both sides thereof, thus forming in plan view the shape of an H, a load carrying wheel journalled on said legs at each side of said central frame piece, downwardly extending jaws secured to said central frame piece and straddling the vehicle supporting structure, and upper and lower side guide wheels resiliently supported on each of said jaws for guiding engagement with the opposite sides of said monobeam.

3. The combination defined in claim 1, wherein said bogie includes spaced apart parallel longitudinally extending frame members, said frame members carrying on their opposed ends load carrying wheel axle bearings having rotatably journalled therebetween load carrying wheel axles which rotatably mount vehicle load carrying wheels, and wherein said additional suspension means comprise shafts arranged substantially parallel to the load carrying wheel axles of said bogie, said shafts being pivotally supported from the vehicle body and each having fixed thereto two spaced laterally extending lever pieces aligned in the same direction, and connecting rods, each connected at one end to one of said lever pieces and at the other end pivoted to the bogie about an axis substantially parallel to said shafts.

4. The combination according to claim 3, wherein said connecting rods are pivotally connected to cantilever brackets fixed to the bearings for the axles of the carrying wheels.

5. A monobeam straddling bogie for supporting the adjacent ends of two monorail vehicle bodies comprising means forming a pair of spaced independent vertical pivots on said bogie, each pivotally supporting one end of one of said vehicle bodies, spring suspension means resiliently supporting said pivots on said bogie, said means acting in a vertical direction, and additional means independent of said spring suspension means and operatively connected between said adjacent ends of each of said vehicle bodies and said bogie, said last-mentioned means preventing tilting movements of the vehicle bodies about a longitudinal axis with respect to said bogie.

6. A bogie according to claim 5, wherein said bogie is comprised of a central frame piece to which longitudinally extending legs are secured at both sides thereof which rotatably journal at the opposed ends thereof carrying wheel axles which rotatably mount vehicle carrying wheels, said pivots having transverse girders cantilever supported therefrom, the outwardly extending opposed ends of said girders being off-set downwardly at both sides of the upper surface of the central frame piece of said bogie, said bogie further including laterally projecting brackets disposed in vertically spaced relation beneath the opposed ends of said transverse girders, said vertically acting spring suspension means being operatively interposed between the opposed ends of said transverse girders and the respective brackets, and the adjacent ends of said vehicle bodies being adapted to be supported on the opposed ends of said transverse girders.

7. In combination, a monobeam straddling bogie having rotatably mounted vehicle carrying wheels and a monorail vehicle body having a floor structure resiliently supported on said bogie, means carried by said bogie and operatively interposed between said bogie and said vehicle body to resiliently support said vehicle body on said bogie and additional means carried by said bogie operatively connected to said vehicle body, said additional means preventing tilting movement of the body about a longitudinal axis with respect to said bogie, said additional means including a shaft, said shaft being pivotally supported from said vehicle body and having fixed thereto two lateral lever pieces aligned in the same direction, and connecting rods connected between said lever pieces and said bogie, said connecting rods being pivoted to said bogie about an axis substantially parallel to said shaft, said shaft being arranged substantially level with the floor structure of said vehicle as close as possible to the carrying wheels of the bogie and the ends of said connecting rods which are pivotally connected to said bogie being substantially level with the axis of said carrying wheels, said connecting rods and said lever pieces forming substantially a right angle when said vehicle is loaded.

8. For use on a monobeam track, a vehicle body, a load carrying wheel mounted for rotation about a substantially horizontal axis transverse to the body for rolling engagement with the top of the monobeam, a pair of laterally spaced guide wheels disposed on opposite sides of and in rolling engagement with the monobeam and journalled for rotation about substantially vertical axes, a relatively soft suspension operatively interposed between said body and the load carrying wheel, a relatively hard suspension operatively interposed between the body and the guide wheels, and means interconnecting said body to said relatively hard suspension and isolating said body from said relatively soft suspension for transmitting swaying movements of said body to said relatively hard suspension.

References Cited in the file of this patent
UNITED STATES PATENTS
2,987,013    Rosenbaum _____ June 6, 1961

UNITED STATES PATENT OFFICE

CERTIFICATE OF CORRECTION

Patent No. 3,143,977　　　　　　　　　　　　August 11, 1964

Konrad Deller

It is hereby certified that error appears in the above numbered patent requiring correction and that the said Letters Patent should read as corrected below.

Column 5, line 51, after "additional" insert -- suspension --.

Signed and sealed this 8th day of December 1964.

(SEAL)
Attest:

ERNEST W. SWIDER
Attesting Officer

EDWARD J. BRENNER
Commissioner of Patents